UNITED STATES PATENT OFFICE.

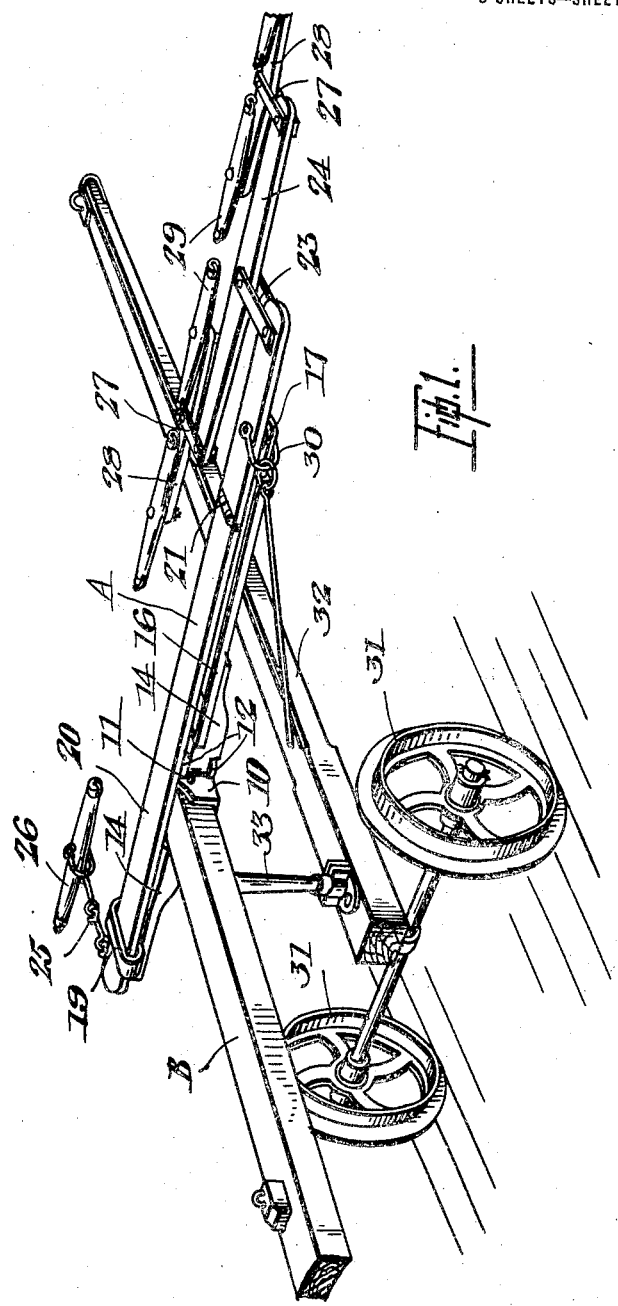

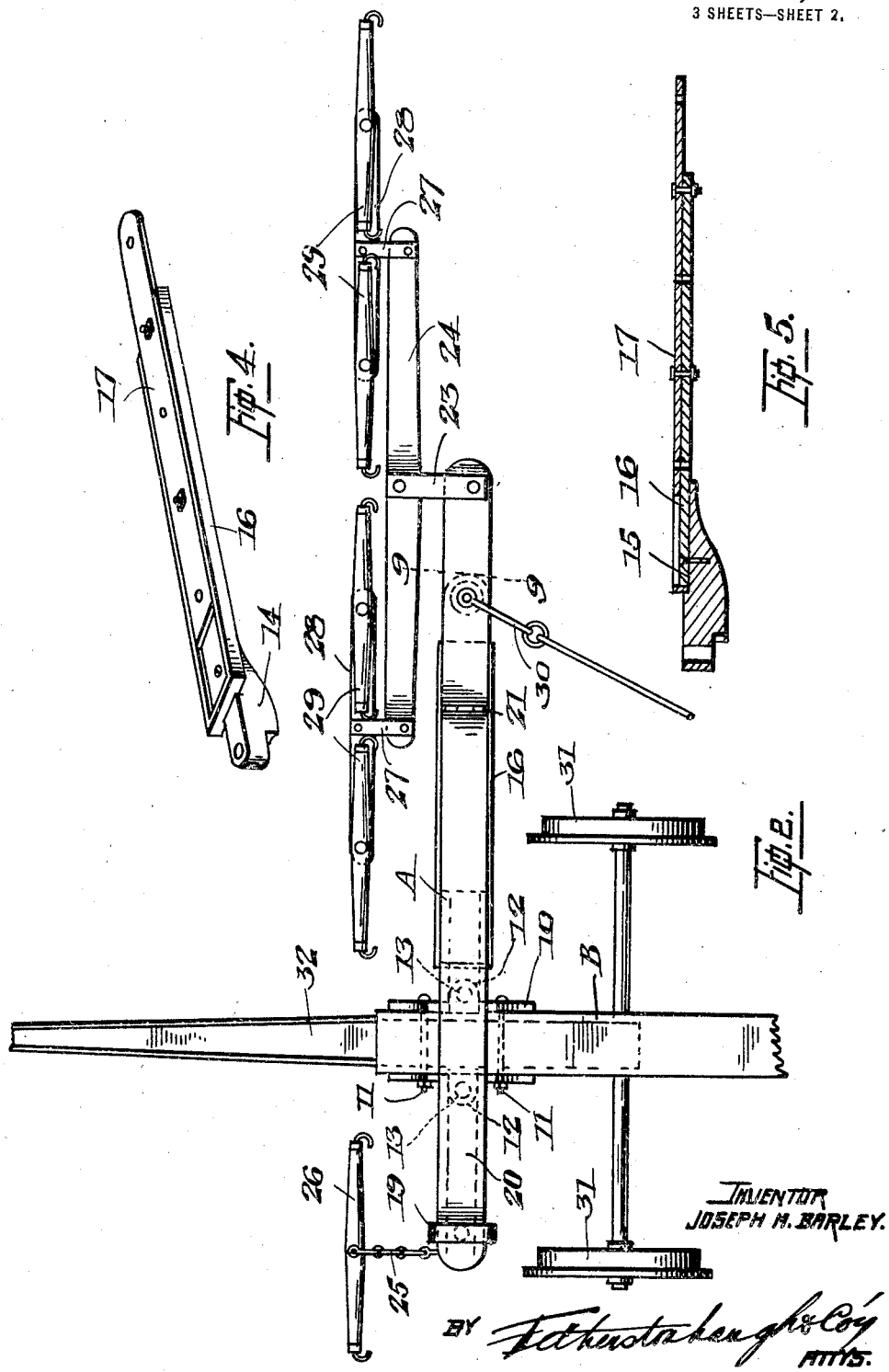

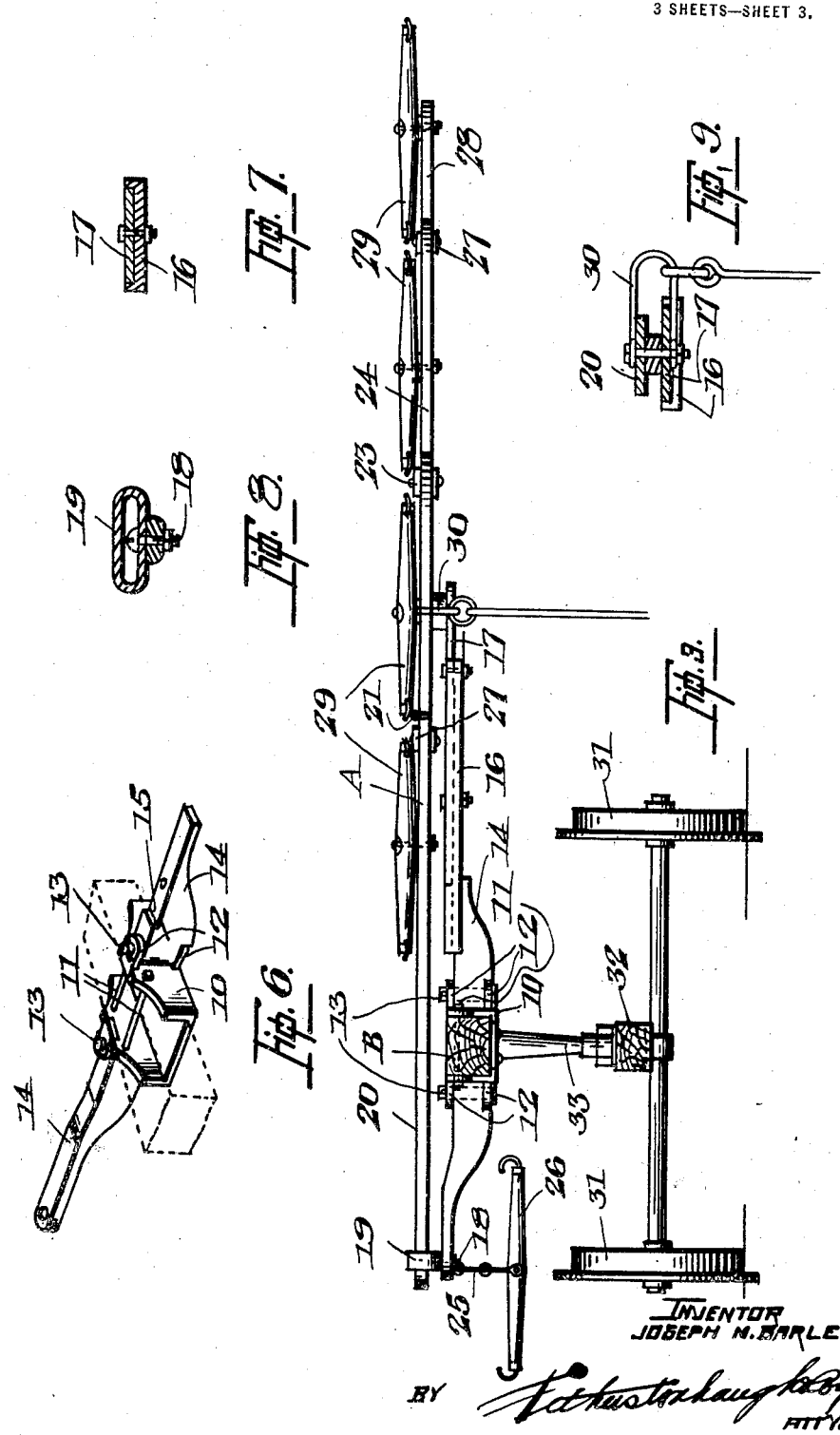

JOSEPH MARION BARLEY, OF PRINCE ALBERT, SASKATCHEWAN, CANADA.

MULTIPLE HORSE-HITCH.

1,357,830.  Specification of Letters Patent.  Patented Nov. 2, 1920.

Application filed April 15, 1920. Serial No. 374,164.

*To all whom it may concern:*

Be it known that I, JOSEPH MARION BARLEY, a subject of the King of Great Britain, a resident of the city of Prince Albert, Province of Saskatchewan, Dominion of Canada, have invented certain new and useful Improvements in Multiple Horse-Hitches, of which the following is a specification.

This invention relates to improvements in multiple horse hitches, and the objects of the invention are to facilitate distributing the load uniformly among the horses used to provide the tractive force, to permit of the ready adjustment to the hitch, to so arrange the several parts that they are readily accessible for inspection, and generally to adapt the hitch to better perform the functions required of it.

With the above and other objects in view, the invention consists essentially of the improved construction particularly described in the following specification and illustrated in the accompanying drawings forming part of the same.

In the drawings:

Figure 1 is a perspective view of the improved multiple horse hitch as seen when used on a binder.

Fig. 2 is a plan view of the same.

Fig. 3 is a rear elevation of the improved multiple horse hitch.

Fig. 4 is a perspective view of the adjustable arm of the hitch.

Fig. 5 is a longitudinal section of the arm shown in Fig. 4.

Fig. 6 is a perspective view of the bracket whereby the hitch is secured to a binder.

Fig. 7 is a transverse section through the arm shown in Fig. 4.

Fig. 8 is a transverse section of the elongated ring or link which connects the lever to one of the arms.

Fig. 9 is a transverse section on the line 9—9 of Fig. 2.

Like characters of reference refer to like parts in the several figures.

Referring to the drawings; A represents the improved multiple horse hitch and B the binder tongue to which the hitch is secured. The multiple horse hitch A comprises a U-shaped bracket 10 which embraces the front end of the binder tongue B and is secured thereto by bolts 11 or the like.

On the lateral wall of the bracket 10 lugs 12 project and are arranged in spaced relation and carry hinge pins 13 to which the arms 14 are hingedly attached.

One of the arms 14 has its upper face cut away as shown at 15 to engage with a guide member 16 which is secured to the arm by bolts or the like, and this guide member engages with an adjustable board 17 which is provided with a plurality of perforations therethrough.

The other arm 14 is provided at the outer end with an orifice through which the bolt 18 extends to secure the link or ring 19 in position, and this link or ring engages with the rod 20 which constitutes a lever and may be formed of several sections hingedly connected as at 21, and the rod or lever 20 is attached to the adjustable board 17.

The end of the rod or lever 20 projects beyond the adjustable board 17 and carries a connection 23 by means of which a double tree 24 is secured to the said lever.

The end of the lever 20 opposite to the doubletree 24 is provided with a link attachment 25 which is connected to the whiffle tree 26. The doubletree 24 is connected at the ends by the links 27 to the swingletrees 28 which are provided with whiffle trees 29 at each end thereof.

A bail 30 is pivotally attached to the lever 20 and to the adjustable board 17, and a link extends rearwardly from the bail 30 and is designed to be attached to the binder.

Front wheels 31 are attached to the tongue 32, and a post 33 extends upwardly from the tongue 32 and is attached to the tongue of the binder B.

The assembly of the hitch will be readily understood from the foregoing description.

When the hitch is in use a horse is harnessed to the whiffle tree 26, and a plurality of horses are harnessed to the whiffle trees 29.

In the embodiment illustrated five horses can be used and the lever 20 is so arranged that the load is evenly distributed among all five horses, so that the pulling power of each horse is thus economically and advantageously utilized.

The hitch is so constructed that it can be attached to any type of agricultural machine in which a team of horses is required, and the hitch may be detached from one machine and attached to another and if found necessary three, four or five horses can be used.

When using three horses the doubletree 24 would have attached to the end thereof whiffle trees, and thus three horses could be harnessed to the machine with ease.

The several parts of the hitch are so arranged that they are at all times readily accessible for inspection and they may be made light and durable, while at the same time there is nothing liable to go out of repair.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A horse hitch comprising a bracket, a pair of arms pivoted to the bracket, an extension member attached to one arm, a lever connecting both arms, a double tree connected to that side of the lever adjacent to the extension, whiffle trees attached to the doubletree, and a whiffle tree attached to the opposite end of the lever.

2. A multiple horse hitch comprising a U-shaped bracket having lugs on the side thereof, arms pivotally mounted to the lugs, a lever connected to both arms, a ring carried by one of the arms engaging the lever, a whiffle tree connected to the one end of the lever, a doubletree connected to the other end of the lever, and whiffle trees attached to the doubletree.

3. A multiple horse hitch comprising a bracket, a pair of arms pivoted to the bracket, a guide member attached to one of the arms, an adjustable extension board attached to the guide member, a ring on the opposite arm, a lever engaging with the ring and pivotally secured to the extension member, a whiffle tree connected to one end of the lever, a doubletree connected to the other end of the lever, and whiffle trees connected to the doubletree.

In witness whereof I have hereunto set my hand in the presence of two witnesses.

JOSEPH MARION BARLEY.

Witnesses:
RICHARD MULCASTER,
CHAS. NIVINS.